Sept. 18, 1923.

W. M. FORSYTH

BRAKE FOR VEHICLES

Filed Dec. 14, 1921

1,468,014

WITNESSES
Frank B. Cook
Harry E. Seidel

W. M. Forsyth  INVENTOR

BY  C. G. Siggers

ATTORNEY

Patented Sept. 18, 1923.

1,468,014

UNITED STATES PATENT OFFICE.

WILLIAM MARCUS FORSYTH, OF DUBACH, LOUISIANA, ASSIGNOR OF ONE-HALF TO JOHN P. VOSS, OF DUBACH, LOUISIANA.

BRAKE FOR VEHICLES.

Application filed December 14, 1921. Serial No. 522,337.

*To all whom it may concern:*

Be it known that I, WILLIAM M. FORSYTH, a citizen of the United States, residing at Dubach, Lincoln Parish, and State of Louisiana, have invented a new and useful Brake for Vehicles, of which the following is a specification.

This invention relates to vehicles, and is more particularly directed to an automatic braking means resisting the rapid downward movement of the vehicle on an incline.

An object of this invention is to provide a braking means for vehicles which is automatically operated to check the rapid travel of the vehicle when the same is descending a hill, and which braking means is operated by the backing chains connected to the horses' collars when said horses attempt to resist the rapid travel of the wagon.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Figure 1:
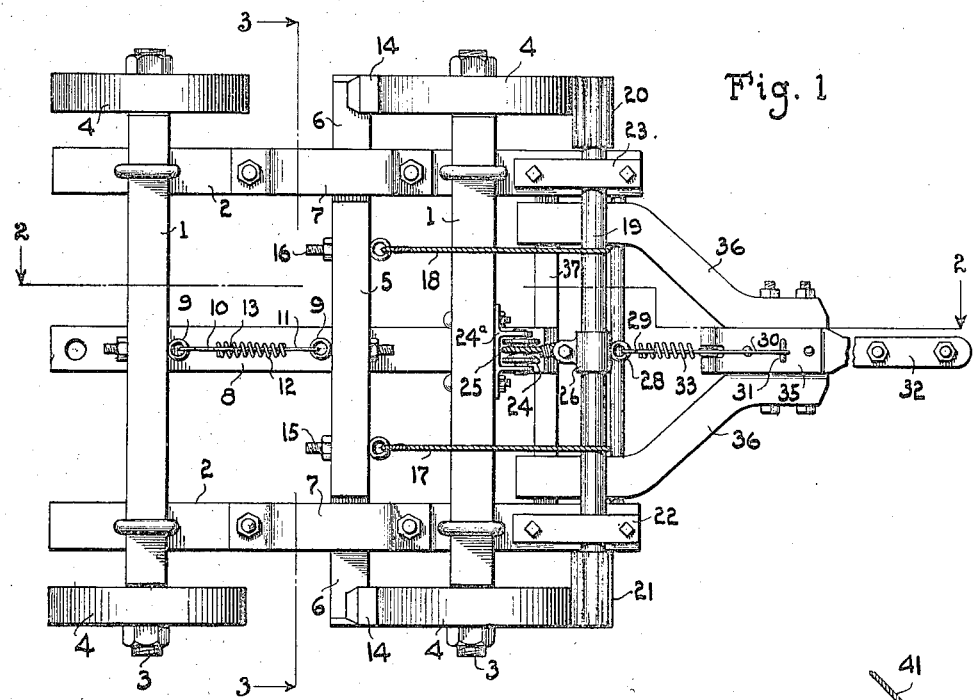
Fig. 1 is a bottom plan view of the forward wheeled supporting frame of a log wagon.
Figure 2:
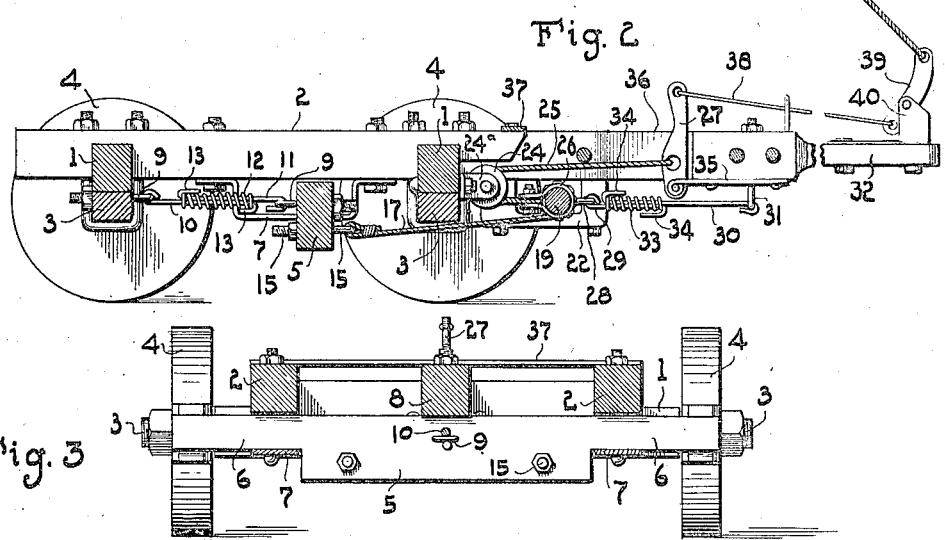
Fig. 2 is a longitudinal section of the vehicle taken along the line 2—2 of Fig. 1.
Figure 3:
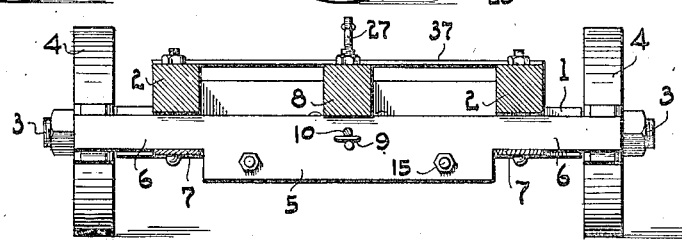
Fig. 3 is a transverse view of the same taken along the line 3—3 of Fig. 1.

It will be seen that only the forward portion of the logging vehicle which supports the tongue is shown, and which is adapted to be connected in any improved manner to a rear carriage for supporting the rear ends of the logs. The front portion of the vehicle comprises a framework having transverse bolsters 1 secured to the longitudinal frame members 2 with the usual axles 3 upon which are rotatably mounted vehicle wheels 4.

A brake beam 5, having its outer ends 6 reduced, is slidably mounted in depending brackets 7 secured to the bottom of the longitudinal frame members 2. A longitudinal beam 8 secured upon the bolsters 1 is mounted centrally of the vehicle and provides an auxiliary bracing means for the body of the vehicle.

The rear bolster 1 and the brake beam 5 are provided with eye bolts 9 engaged respectively by links 10 and 11 which overlap each other for a portion of their lengths. A coil spring 12 surrounds the overlapped portions of the links 10 and 11 and is held in position by bent portions 13 formed on the free ends of the links 10 and 11 and engaging opposite ends of the coil spring 12. The tensioning means just described is adapted to maintain brake shoes 14 secured to the brake beam 5 out of engagement with the front vehicle wheels 4.

Upon opposite sides of the eye bolt 9 are secured eye bolts 15 and 16 having the flexible elements 17 and 18 at their rear ends, respectively, secured in said eyes, the forward ends of the flexible members being rigidly secured to a shaft 19 and adapted to be wound upon said shaft when the friction rollers 20 and 21 are forced into engagement with the front wheels 4 and rotated thereby.

The shaft 19 is not only rotatably mounted, but is also slidably mounted in brackets 22 and 23 secured to the underneath faces of those portions of the longitudinal frame members 2 which extend beyond the front bolster 1.

A grooved pulley 24 is rotatably mounted in a bracket 24$^a$ rigidly secured on the forward bolster 1 and has a flexible element 25 connected at one end to rearwardly projecting flanges integrally formed on a collar 26 loose on the shaft 19, the other end of the flexible element being connected to a lever 27. The collar 26 has a forwardly-extending eye 28 in which is adapted to be inserted the bent end of a link 29 which is in overlapping position with a portion of a link 30 having a bent end connected with an eye bolt 31 secured to the inner end of a vehicle tongue 32.

A coil spring 33 is mounted upon the overlapped portions of the links 29 and 30, and is held in position by means of inwardly bent portions 34 of the links 29 and 30, engaging opposite ends of the coil spring. The spring 33 normally maintains the friction rollers 20 and 21 out of engagement with the front vehicle wheels 4 by exerting a pull upon the collar 26, and likewise causing the shaft 19 to be drawn forwardly in the brackets 22 and 23.

The lever 27 is pivotally mounted at its lower end upon a strap hinge connection 35 secured to the under face of the rear end of the tongue. The tongue is rigidly mounted between the forwardly and inwardly projecting ends of hounds 36. The rear ends of the hounds are spaced from each other, maintained in horizontal position by a bar 37, and pivotally mounted on those portions of the longitudinal frame members which extend beyond the front bolster 1.

The upper end of the lever 27 is connected by means of a link 38 to the lower end of a lever 39 which is pivotally mounted between the ears of an upstanding bracket 40 secured to the free end of the tongue 32. The upper end of the lever 39 is connected to flexible backing elements 41 which are, as usual, connected to the yokes or collars of the draft animals.

The operation of my device is as follows:—

When the vehicle is heavily loaded with logs and is descending a hill, the force of gravity tends to impel the vehicle at a very rapid rate down the incline, and therefore it is necessary to use a braking means that will effectually check the rapid downward movement of the vehicle without requiring the attention of the driver. As is usual, the draft animals will have a tendency to resist the movement and pull back upon the backing chains, and since the lever 39 is connected to the collars of the draft animals by means of the flexible elements 41, the upper portion of the lever 39 will be drawn backwardly while the lower end will be forced forwardly, carrying the link 38 forwardly and likewise the upper end of the lever 27. Since the flexible element 25 is connected at a point on the lever between its pivotal point and its upper free end, a forward pull will be exerted upon that portion of the flexible element which is attached to the lever 27 and cause the flexible element to move forwardly and over the pulley 24 and exert a rearward pull on the collar 26 and likewise the shaft 19.

When the shaft 19 is moved rearwardly, the rollers 20 and 21 are forced into frictional engagement with the front vehicle wheels 4, and since the wheels 4 are rotating, the friction rollers 20 and 21 will be rotated as will the shaft 19 and wind the flexible elements 17 and 18 upon said shaft. As the flexible elements 17 and 18 are wound upon the shaft 19, they will draw the brake beam 5 forwardly towards the front axle and move the brake shoes 14 into frictional engagement with the rims of the vehicle wheels 4 and thereby check the progress of the vehicle in its downward trend.

The greater the pull on the flexible backing elements 41, the greater will be the frictional engagement between the rollers 20 and 21 and the wheels 4, and therefore the greater the frictional engagement will be between the brake shoes 14 and the vehicle wheels. When the vehicle has reached the bottom of the hill and is again running along level land, the horses will move forwardly to pull the vehicle and cause the flexible elements 41 and 25 to relax, permitting the coil spring 33 to move the shaft 19 forwardly and throw the friction rollers 20 and 21 out of engagement with the front vehicle wheels 4.

Since the tension upon the spring 12 has also been relieved, it will not only exert a rearward pull upon the brake beam 5 to release the brake shoes 14 from their engagement with the wheels 4, but will exert a pull upon the flexible elements 17 and 18, thereby causing the flexible elements to unwind from the shaft 19 and rotating the shaft in a direction which is reverse of the direction in which the friction rollers 20 and 21 are rotated when in frictional engagement with the wheels 4.

The parts now are in normal position and are ready to respond to a rearward pull on the backing element 41 for again causing the rollers 20 and 21 to be frictionally engaged by the wheels 4 and thereby rotated for forcing the brake shoes attached to the brake beam 5 into braking engagement with the wheels 4.

While I have shown the automatic braking mechanism in operative relation with one form of a log wagon, I wish it distinctly understood that the braking mechanism may be equally well applied to any form of vehicle that may be drawn by either horses or oxen.

What is claimed is:—

1. In a device of the character described, a wheeled supporting frame, a slidably mounted brake beam having brake shoes, a shaft rotatably and slidably mounted on the frame, friction wheels on said shaft, a grooved pulley loosely mounted adjacent the shaft, a flexible element connected with the shaft and movable over the pulley, a lever connected to the flexible element, a second lever pivotally mounted on the tongue of the vehicle and having means for connecting it to the neck yoke or collar of a draft animal, a link connecting the levers in operative relation, and a second flexible element connected at one end to the shaft and adapted to be wound thereon, the other end of the second flexible element being connected to the slidable brake beam.

2. In a device of the character described, a wheeled supporting frame, a slidably mounted brake beam having brake shoes, a shaft rotatably and slidably mounted on the frame, friction wheels on said shaft adapted to engage rims of the vehicle wheels, a pulley loosely mounted adjacent the shaft, a flexible element connected with the shaft and movable over the pulley, a lever mounted at one end and connected to the flexible element, a second lever pivotally mounted on the tongue of the vehicle and having means for connecting it to the neck yoke or collar of a draft animal, a link connecting the levers in operative relation, a flexible element connected at one end to the shaft and adapted to be wound thereon, the other end of the second mentioned flexible element being connected to the slidable brake beam, means for maintaining the brake shoes in spaced relation with the rims of the wheels, and means for maintaining the friction wheels out of engagement with the rims of the vehicle wheels.

3. In a device of the character described, a frame having a wheeled axle and a draft tongue, a brake beam slidably mounted upon one side of the vehicle axle and provided with brake shoes, a shaft rotatably and slidably mounted upon the opposite side of the vehicle axle provided with rigidly mounted rollers adapted to frictionally engage the vehicle wheels, a flexible element connecting the brake beam with the shaft and adapted to be wound on said shaft, a lever pivotally mounted on one end of the tongue, a loosely mounted pulley adjacent the shaft, a flexible element movable on the pulley and connected at one end to the lever and resiliently connected at its other end to the tongue, a lever pivotally mounted at the other end of the tongue, a link operatively connecting the levers, the second-mentioned lever having a backing element for connection to the yoke or collar of a draft animal and adapted to be operated by a rearward pull for causing the second-mentioned flexible element to force the friction rollers into engagement with the rims of the wheels whereby the shaft is rotated and the first-mentioned flexible element is wound on the shaft to force the brake shoes into engagement with the rims of the vehicle wheel, and means for forcing the brake shoes out of engagement with the vehicle wheels when the backing element is released and causing a reverse rotation of the shaft.

4. In a device of the character described, a wheeled supporting frame, a slidably mounted brake beam having brake shoes, a shaft rotatably and slidably mounted on the frame and provided with friction pulleys rigidly mounted on the shaft and adapted when engaged by the rims of the wheels for rotating the shaft, a lever pivotally mounted on the tongue of the vehicle and having means for connecting the same to the neck yoke or collar of a draft-animal for operating said lever by a rearward pull, means connected with the lever for causing the shaft to move rearwardly on the frame and force the friction rollers into engagement with the rims of the wheels, and means connecting the shaft with the brake beam for forcing the brake shoes into engagement with the wheels when the shaft is rotated, and means for throwing the friction pulleys and the brake beam out of engagement with the wheels when the pull upon the lever is released.

5. In a device of the character described, a wheeled supporting frame, a brake beam slidably mounted upon one side of a vehicle axle and having brake shoes, a shaft rotatably and slidably mounted upon the opposite side of the said axle and provided with rigidly mounted rollers, means operatively connecting the shaft and brake beam, and means adapted to be connected to the neck yoke or collar of a draft animal and operable by a backward pull to cause the shaft and brake beam to move toward each other and cause the pulleys and shoes to frictionally engage the rims of the vehicle wheels.

In testimony, that I claim the foregoing as my own, I have hereto affixed my signature.

WILLIAM MARCUS FORSYTH.